United States Patent [19]

Heinrich et al.

[11] 4,454,172
[45] Jun. 12, 1984

[54] LINING METAL TUBING WITH A CORROSION- AND ABRASION-PROOF CEMENT MORTAR

[75] Inventors: Bruno Heinrich; Wilhelm Schwenk, both of Duisburg, Fed. Rep. of Germany

[73] Assignee: Mannesmann AG, Duesseldorf, Fed. Rep. of Germany

[21] Appl. No.: 515,543

[22] Filed: Jul. 20, 1983

[30] Foreign Application Priority Data

Jul. 21, 1982 [DE] Fed. Rep. of Germany ....... 3227592

[51] Int. Cl.³ .................. B05D 7/22; B05D 3/04; B05D 3/12
[52] U.S. Cl. .................. 427/234; 427/238; 427/239
[58] Field of Search ............ 427/238, 239, 234

[56] References Cited

U.S. PATENT DOCUMENTS 2,002,701  5/1935  McWane .................. 427/234
3,837,899  9/1974  Carlberg .................. 427/234 X
4,298,634  11/1981  Phelps .................. 427/234 X

*Primary Examiner*—James R. Hoffman
*Attorney, Agent, or Firm*—Ralf H. Siegemund

[57] ABSTRACT

A blend of at least 35 percent alumina and not more than 45 percent calcium oxide is blended with sand at a sand-to-cement ratio preferably 1.8 and applied to the interior of a metal pipe, for example, by means of centrifugal application and compression. Following which the resulting lining is exposed to moisture for several hours which exposure step is in turn followed by an exposure to warm steam also for several hours.

4 Claims, No Drawings

LINING METAL TUBING WITH A CORROSION- AND ABRASION-PROOF CEMENT MORTAR

BACKGROUND OF THE INVENTION

The present invention relates to the making of an abrasionproof and corrosionproof inner lining for metal tubes or pipes, the lining is to be made from a mortar cement and will serve as protection against lime desolving or lime exchanging an extracting water.

It has been known for many years to line water pipes by means of a cement mortar lining for purposes of corrosionproofing the pipe. The mortar lining is usually applies by means of centrifugal forces. The lining so made has, for example, a water cement value of about 0.4 at mixing ratio of sand-to-cement of about 2.5. The 1978 DVGW work sheet W342 describes by way of example the requirements for such alignment.

The DVGW worksheet W343 of 1981 describes alternative procedures by means of which the cement mortar is inserted and internally applied. Such a method is also described in the German printed patent application No. 2620669. For technological reasons, the blend ratio has to be smaller in this case, however, there will be corresponding a larger water cement value corresponding accordingly to a lower rate of compression. The normal or regularly used cement mortar linings made in this manner are sufficient for purposes of providing corrosionproofing against most types of water that passes through. In the case of a lime desolving water which is rich in carbon dioxide, or in the case of industrial liquid wastes with a strong acidity, or in the case of salt water that is prone to exchange calcium, a certain corrosive abrasion may occur depending of course upon the relative content of the agressive material in the water. After the calcium has been dissolved from the mortar structure, that structure is softened so that sand will be extracted from the lining due to water errosion; in the case of temporary drying, such as occurs pursuant to repair and shutdown a considerable amount of the sand is also removed.

These phenomenon have been described, for example, in "3R-intern. 17H. 7S. 448/459 of 1978." The publication "Zentralblatt F. Industriebau" Vol. 26 1980 P. 307–309 suggests an improvement particularly a protection against the removal of sand, in that the mortar blend receives an addition which includes a certain synthetic dispersion. Such mortars blended with synthetic are also used for example in accordance with German printed patent application Nos. 2620669 or 3010525.

Such a blended mortar lining could already be deemed an ideal corrosion protection, provided further properties which are required are likewise satisfied; unfortunately, that is not the case. It has to be observed, for example, that the pipe are transported to the installation site and installed thereat. It was found that a cement mortar lining in pipes may in general exhibit cracks. In the case of sweet water, the cracks are usually "cured," but in the case of water with a high salt content, these cracks serve as starting points for strong local corrosion. Contrasted with these effects must be the requirements set forth in the DVGW worksheet W270 as per 1981. These requirements relate particularly to a hygenicly perfect lining for pipes transporting drinking water. In view of the possibility that certain microbes can grow on mortars which have been blended with a synthetic (plastic) material, these blends cannot be used for purposes of lining drinking water pipes!

The aforementioned aspects boil down to the proper selection of a mortar which can be suitably worked, which will be subjected unavoidably to a decalcifying process through an attack by acid water, but retains its dense structure and will not loose the sand from the mortar blend. A corrosion test has been conducted in lime desolving water to which a particular lining material was exposed. Following the publication mentioned above (3R-into 17 of 1978) a 0.1 molar acetate buffer solution having a pH value of 4.5 was used as test medium and formed very suitable. The period of exposure was about six months and led to a very strong decalcification. The amount of calcium loss was equivalent to a corresponding loss experienced after about 10 years when the layer is exposed to regular, carbon dioxide containing water. After drying of the cement mortar sample, the surface near decalcified layer was prone to lose sand to a considerable extent. Abrasion can be measured and used as a measure or parameter indicating the tendency of the layer to lose sand. Since the abrasion inherently increases with the initial content in sand it is desirable to indicate, for purposes of comparison, the abrasion in relation to the sand content, i.e., in grams per square meter. These abrasion values (in percentages) for cement mortar samples made of portland cement are, for example, 25 to 30 grams per meter square. In cases of lean blends with a mixing ratio above 2.5 the abrasion value may increase to about 40 percent, but compression during centrifugal application can reduce the value to below 25 percent.

Occasionally, it has been suspected that a strong reduction in the mixing ratio will reduce the tendency for sand removal. However, even in the case of 1 to 1 ratio (sand-to-cement) this is not the case. On the other hand, one can suspect that blast furnace cement, being relatively poor in CaO is more resistant against loss in calcium. Indeed abrasion values of about 10 to 15 percent, indicate that this is to some extent the case, but still quite unsatisfactory.

It was also found that alumina cement containing still less CaO than blast furnace cement has a still lower abrasion, it dropped to a value of about 2 to 3 percent. Thus, this type of cement indicates an improvement by a factor of 10 in relation to portland cement. On the other hand, portland cement blended with a synthetic material exhibits an abrasion value of about 0.1 so that the alumina cement is still considerably more prone to experience corrosion and abrasion, than regular cement with a synthetic blend component.

DESCRIPTION OF THE INVENTION

It is an object of the present invention to provide a new and improved cement mortar lining for metal tubing particularly for pipes and tubes to be used for the conduction of drinking water whereby the lining is as corrosionproof as a mortar blended with a synthetic, but the new mortar cement is to be free from synthetic and still will not exhibit the tendency to lose sand.

It is a feature of the present invwention to improve the abrasionproofing of alumina cement.

In accordance with the preferred embodiment of the present invention, a blend is suggested which includes at least 35 percent (by weight) alumina and not more than 45 percent (by weight) calcium oxide to which sand is added at a sand to mortar ratio between 0.5 and 3, preferably 1.8; such blend is deposited conventionally (e.g. by centrifugal force) in the interior of tubing or pipes as lining thereof following which the resulting lining is post treated through application of moisture which in turn is followed by an exposure to water vapor. The water exposure moisture treatment should last at least two hours preferably six hours and a subsequent exposure to water vapor should last at least for one hour preferably four hours and is to occur at a temperature between 50° and 100° C. preferably 70° C.

The moisture-and-steam treatment following the application of the layer by means of a centrifugal application method or the like, which also compresses the lining as applied, improves the corrosionproofing properties to such an extent that in fact the lining becomes comparable to known cement mortar-synthetic-blends, but of course without utilization of the objectionable synthetic. The lining is particularly cured in an accelerated fashion by the exposure to steam so that the lined tube or pipe can already be transported without any danger of cracking after about a day which favorable contrasts with the usual 28 hour curing period in which conventionally such a line tube or pipe had to be stored under exposure to moisture.

It should be mentioned that regular mortar made on the basis of a portland cement or of a blastfurnace cement, will be improved as to the mechanical properties if such a moisture treatment is applied, but these known cements will not improve their corrosion chemical properties. In the case of the new lining, it was surprisingly found that the particularly combined water storage and steam-heat treatment strengthens the alumina containing mortar composition to such an extent that even after some lime has been leached out of the layer, for example, through certain acids or agressive salts or saline liquids being rich in magnesium and sulfate ions, there is very little if any loss in sand.

In the following an example of the inventive method will be described:

The cement in accordance with the preferred embodiment includes for example 39 percent $AL_2O_3$; 38.5 percent CaO; 4.5 percent silicon dioxide, 12 percent $Fe_2O_3$ and 4 percent FeO, all percentages by weight. A blend of this nature is mixed with sand having a grain size between 0.1 and 1.5 millimeters at a mass ratio of sand-in-cement of 1.8:1. The starting water volume used should be as small as possible and should for example, constitute about one third of the mass of the cement. The completely blended mortar is then centrifugally applied to a pipe in a conventional manner. Following the centrifugal application and compression, the mortar is exposed for four hours to water or is at least kept moist for that period, following which steam is applied at a temperature of 70° C. for about four hours. The thus completed lining when exposed to the test outlined above exhibits an abrasion below 0.2 percent grams per square meter. Without the water-steam post treatment, the abrasion would be considerably higher, i.e, it would be about two to three gram per square meter.

The invention is not limited to the embodiments described above, but all changes and modifications thereof not constituting departures from the spirit and scope of the invention are intended to be included.

We claim:

1. A method for lining metal tubing with an abrasion-proof and corrosionproof lining comprising the steps of:
   Providing a blend of an alumina cement which includes at least 35 percent alumina and at the most 45 percent calcium oxide;
   adding to the blend sand to obtain a mortar blend at a ratio between 0.5 and 3 of sand-to-cement;
   applying the mortar blend to the interior of the tubing under compressing conditions;
   exposing the lining to water for several hours; and
   subsequently exposing the lining to steam.

2. Method as in claim 1 wherein said exposure step to water lasts at least two hours.

3. Method as in claim 1 wherein said exposure step to steam lasts one hour.

4. Method as in claim 1 wherein said ratio is about 1.8 said exposure step to water lasts about six hours and said exposure step to steam lasts about four hours at a temperature of 70° C.

* * * * *